United States Patent [19]

Schröder

[11] 3,962,407

[45] June 8, 1976

[54] PROCESS OF PREVENTING CORROSION OF A METAL WALLED SYSTEM CONTAINING MOLTEN FLUORIDE

[75] Inventor: Johann Schröder, Aachen, Germany

[73] Assignee: U.S. Philips Corporation, New York, N.Y.

[22] Filed: Dec. 4, 1974

[21] Appl. No.: 529,363

[30] Foreign Application Priority Data

Dec. 6, 1973  Germany............................ 2360850

[52] U.S. Cl.............................. 423/464; 423/412; 423/490; 423/625; 423/627; 423/659
[51] Int. Cl.² ...................... C01D 3/02; C01F 11/22
[58] Field of Search ........... 423/490, 659, 464, 625, 423/627, 412

[56] References Cited
UNITED STATES PATENTS

| | | | |
|---|---|---|---|
| 393,258 | 7/1943 | Beck et al............................ | 423/659 |
| 3,023,115 | 2/1962 | Wainer......................... | 423/465 UX |
| 3,077,380 | 2/1963 | Wainer et al........................ | 423/625 |
| 3,147,076 | 9/1964 | Matkovich......................... | 423/412 |
| 3,238,018 | 3/1966 | Winter et al........................ | 423/412 |
| 3,282,641 | 11/1966 | Sfiligoj et al................... | 423/490 X |
| 3,307,908 | 3/1967 | Mandorf, Jr........................ | 423/412 |
| 3,488,147 | 1/1970 | Keith et al.......................... | 423/627 |
| 3,565,700 | 2/1971 | Root................................. | 423/490 |

OTHER PUBLICATIONS

J. W. Mellor's "A Comp. Treatise on Inorganic and Theo. Chem.", vol. 8, 1928, Ed., p. 111, Langmans, Green & Co., N.Y.

*Primary Examiner*—Edward Stern
*Attorney, Agent, or Firm*—Frank R. Trifari; Norman N. Spain

[57] ABSTRACT

A method of manufacturing an airtight-sealed system comprising one or more molten alkalifluorides in the operating condition.

The corrosive action of oxygen present in the melt is prevented by adding metallic aluminium and/or zinc to the melt.

3 Claims, No Drawings

PROCESS OF PREVENTING CORROSION OF A METAL WALLED SYSTEM CONTAINING MOLTEN FLUORIDE

The invention relates to a method of manufacturing an airtight-sealed system comprising in its operating condition a melt of an alkali metal, a mixture of alkali metal fluorides or a mixture of one or more alkali metal flourides and alkaline earth fluorides, which system is filled with the said fluorides and is subsequently sealed in a gastight manner ensuring that the system does not comprise oxygen in a chemically unbound state or in the form of oxygen compounds of hydrogen, the alkali metal and/or alkaline earth metals and metals of the system.

In their simplest embodiment, these systems may consist of a single sealed reservoir which is filled with the said fluorides and is in heat-exchanging contact with a heat consuming device, for example, a thermodynamic machine through heat pipes or another heat-transporting system. Furthermore, the systems may have heat pipes and other parts which are in contact with the said molten fluorides. The systems may be used for storing heat, transporting heat or for performing chemical reactions in which the molten fluorides act as reagents or solvents. When such systems are not free from oxygen in a chemically free state or in the form of oxygen compounds of hydrogen, the alkali metals or the metals of the system, an intergranular corrosion of metal parts that are in contact with the fluoride melt may occur. This corrosion may lead to impairment of the reservoir and the walls of the pipes, creating a very dangerous situation due to the presence of molten fluorides.

This intergranular corrosion, in the presence of oxygen and the said reactive oxygen compounds, particularly attacks steel containing chromium and nickel.

In the manufacture of such systems the starting materials are generally fluorides that have been freed from oxygen in a special manner. In one method recommended in literature for this purpose such a quantity of solid ammonium fluoride or ammonium bifluoride is added under an inert gas to a melt of the fluorides to be purified that the melt becomes clear.

The reservoirs, pipes, etc. used must also be carefully freed from oxygen, for which purpose they are heated, for example, in a reducing atmosphere at temperatures of more than 1000°C. The fluorides are introduced into the system in an atmosphere of inert gas whereafter the system is sealed in a gastight manner.

These methods are very cumbrous. The object of the invention is to provide a method of manufacturing corrosion-free systems for storing and transporting heat while using alkali fluorides and alkaline earth fluorides, obviating the drawbacks of the methods used up till now.

The method according to the invention is characterized in that the fluorides are introduced into the system in a molten state in air, metallic aluminum is added to the melt whereafter the system is sealed in a gastight manner.

It has been found that when using the method according to the invention aluminum binds the oxygen present in the system so that intergranular corrosion of the metal walls of the system in contact with the fluoride melt is inhibited.

The quantity of aluminum added to the fluoride melt is preferably chosen to be such that the total quantity of oxygen present in the system that may cause corrosion is bound. This also includes oxygen present in air trapped in the system, oxygen absorbed on the metal surfaces or chemically bound oxygen, and oxygen present in a chemically bound state as water or as an oxygen compound of one or more alkali metal or alkaline earth metals. The quantity of aluminum is preferably also sufficient to bind the quantity of nitrogen trapped in the system together with air.

It has been found that aluminum is soluble in the fluoride melt up to a certain quantity which is generally in the order of 0.1% by weight. Practice has proved that the metal surfaces that are in contact with the aluminum containing fluoride melt are coated with a thin aluminum-containing film. The accurate composition of this film could not, however, be determined with certainty. The hardness of the film is better than that of the steel surface on which the film is present, and which is protected by this film from chemical attack by the melt.

However, a fairly large excess of aluminum must be avoided in order that no rather large drops or coatings of molten aluminum can be formed in the systems according to the invention, which molten aluminum may attack metal surfaces due to dissolution of certain constituents.

The systems according to the invention may comprise, for example, the following fluorides and mixtures of fluorides:
LiF; 60 Mol % LiF + 40 Mol % NaF; 67 Mol % LiF + 33 Mol % $MgF_2$; 52 Mol % LiF + 35 Mol % NaF + 13 Mol % $CaF_2$; 46 Mol % LiF + 44 Mol % NaF + 10 Mol % $MgF_2$; 64 Mol % LiF + 30 Mol % $MgF_2$ + 6 Mol % KF; 46.5 Mol % LiF + 42 Mol % KF + 11.5 Mol % NaF; 65 Mol % NaF + 23 Mol % $CaF_2$ + 12 Mol % $MgF_2$; 75 Mol % NaF + 25 Mol % $MgF_2$; 62.5 Mol % NaF + 22.5 Mol % $MgF_2$ + 15 Mol % KF; 44 Mol % LiF + 40 Mol % KF + 12 Mol % NaF + 4 Mol % $MgF_2$, and 44.9 Mol % LiF + 40.6 Mol % KF + 11.5 Mol % NaF + 3 Mol % $CaF_2$. The mixtures may be prepared from technically pure products. Aluminum may be added to the melt in the form of powder, granulate or tablets, and this preferably immediately before the system is sealed in a gastight manner.

The invention will now be described in greater detail with reference to some examples relating to the use of eutectic mixtures which may be considered as being representative of the above-mentioned mixtures.

EXAMPLE I

A eutectic fluoride mixture of the following composition: 65 Mol % NaF + 23 Mol % $CaF_2$ + 12 Mol % $MgF_2$ was introduced into cylindrical steel reservoirs with approximately 18% by weight of Cr, approximately 10% by weight of Ni, approximately 2% by weight of Mn, approximately 1% by weight of Si, approximately 0.1% by weight of C and approximately 0.5% by weight of Ti, remainder iron, having an internal volume of 160 cubic cm. The eutectic melting point of this mixture is at 745°C. One of these reservoirs was fired in a hydrogen atmosphere at 1200°C and subsequently filled with the melt under an argon atmosphere, evacuated and sealed in a gastight manner. The melt contained less than 0.001% by weight of oxygen. After a 750-hour treatment at 800°C it was found that the melt had been coloured green by dissolved chromium while an intergranular corrosion up to a depth of approximately 100 μm had occurred in the metal walls that were in contact with the melt. Another similar reservoir, which was not pretreated in a hydrogen atmosphere, was filled in air with 180 g of a melt of the above-mentioned composition prepared from the conventional commercially available products without a special purification being effected. The oxygen content of the melt was approximately 0.1% by weight. 0.5 g of aluminum was added to the melt whereafter the reservoir was immediately sealed. Approximately 70 cubic cm of air was entrapped in the empty space of the reservoir above the melt. After a 750-hour heat treatment at 800°C it was found that the melt was still entirely white and, as was proved by means of X-ray fluorescence analysis, contained no dissolved chromium. In addition, no corrosion of the walls of the reservoir could be found during metallurgical experiments.

EXAMPLE II

A melt consisting of 75 Mol % NaF and 25 Mol % $MgF_2$ was tested in an identical manner as in Example I; the eutectic melting point of this mixture was 832°C. After a 750-hour heat treatment at 850°C it was found that in the absence of aluminum corrosion had progressed to a depth of approximately 140 μm. The melt had been coloured green by dissolved chromium.

It was found that under these circumstances corrosion was completely prevented if 0.5 g of aluminum was added to approximately 150 g of the melt. In an X-ray fluorescence analysis no chromium could be found in the melt. In addition it was found that in both Examples the quantity of manganese and silicon dissolved in the fluoride melt was considerably decreased due to the presence of aluminum.

The invention does not relate to systems which in addition to alkalifluorides and optionally alkaline earth fluorides comprise fluorides of radioactive metals such as uranium and thorium. In such systems titanium and magnesium were proposed as corrosion inhibitors. These elements probably prevent a reaction, for example, according to $Cr + 2UF_4 \rightarrow 2UF_3 + CrF_2$ between uranium fluoride and constituents of the metal. Magnesium cannot be used in melts which in addition to alkali metal fluorides comprise no fluorides other than alkaline earth fluorides, if any. In fact, the fluoride ($MgF_2$) is more stable than the fluorides of the alkali metals; addition of magnesium would therefore result in the alkali metals being released, which as such or in the form of oxides or hydroxides possibly formed with impurities of the melt are very corrosive at the temperatures prevailing in the system. Titanium is unsuitable because titanium fluoride is very volatile at the operating temperatures used and will thus disappear as such from the melt.

Only the fluoride of aluminum is less stable than the fluorides of the alkali metals so that there is no risk of free alkali metal being formed when aluminum is added. The oxide of aluminum is, however, more stable than water and more stable than the oxides and hydroxides of the constituents of steel such as chromium, nickel and iron so that these are reduced to metal or hydrogen by addition of aluminum. On the other hand, the composition of the fluoride melts is not affected by the addition of aluminum.

What is claimed is:

1. A method of preventing corrosion of a metal walled system containing a melt of a fluoride selected from the group consisting of at least one alkali metal fluoride and alkaline earth fluoride and mixtures thereof in contact with at least a portion of the metal wall of said system said method comprising filling said system with a melt of a fluoride selected from the group consisting of at least one alkali metal fluoride and alkaline earth fluoride and mixtures thereof and metallic aluminum in the presence of air and then sealing said system in a gastight manner.

2. The method of claim 1 wherein the amount of aluminum added is at least sufficient to bind the total quantity of oxygen and nitrogen present in the system after sealing.

3. The method of claim 2 wherein the amount of aluminum is at most sufficiently large to cause the melt to be saturated with dissolved aluminum.

* * * * *